Sept. 27, 1955  W. H. VORIS  2,719,093
METHODS OF APPLYING PLASTIC COATINGS
Filed June 3, 1952
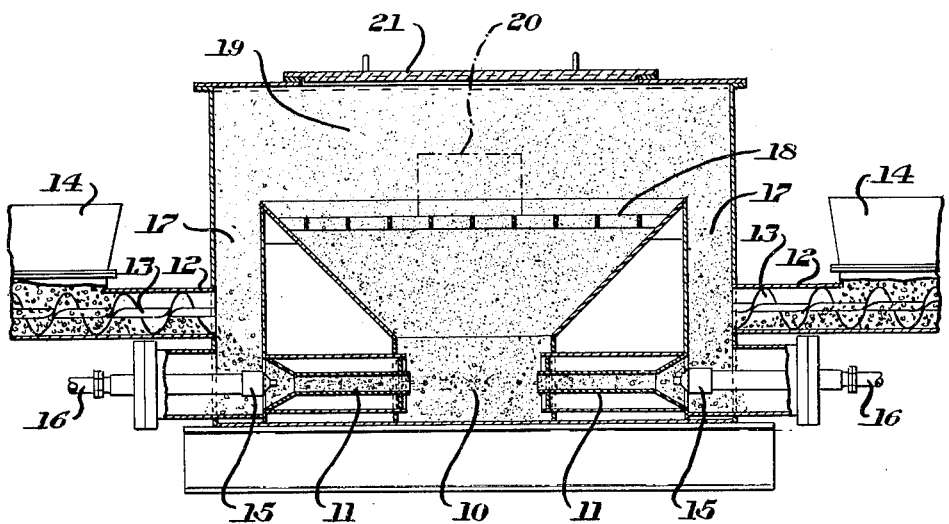
INVENTOR
William H. Voris

United States Patent Office 2,719,093
Patented Sept. 27, 1955

2,719,093

METHODS OF APPLYING PLASTIC COATINGS

William H. Voris, Oakmont, Pa.

Application June 3, 1952, Serial No. 291,399

24 Claims. (Cl. 117—18)

This invention relates to a method of applying plastic coatings and particularly to a method of simultaneously comminuting a plastic coating material, such as thermoplastic and thermosetting resins, both synthetic and natural, and applying it to an object to be coated. It is frequently desirable to coat objects with a protective plastic coating such as a thermoplastic or thermosetting resin either to improve their appearance or to protect them as, for example, against corrosion. Such protective coatings may be used, for example, on the interiors of valves, on wires, metal fabric and the like, where corrosive conditions exist which would otherwise attack the object or where it is otherwise desired to protect or improve the object. It has heretofore been the practice to coat such objects with a suspension or solution of the plastic and thereafter subject it to heat to evaporate the carrier liquid and fuse the plastic particles into a continuous coating. The suspension or solution used in such practices is ordinarily produced by grinding the plastic in ball or pebble mills either with or without the addition of the suspending media. This practice requires a large amount of equipment and a number of separate processing steps and is accordingly time-consuming and expensive. It has also been found difficult to satisfactorily coat the interiors of hollow objects such as valve interiors by painting or spraying with a suspension of plastic materials according to the practices presently employed and that coatings so applied to the interiors are subject to pin holes and other defects which permit the coating to be undermined and the object attacked by whatever corrosive materials pass through the interior. This same difficulty has been encountered in other objects where the shape or constructions of the article makes it difficult to reach one or more surfaces by the ordinary painting or spraying techniques. Moreover, in following the prior art practice, it is virtually impossible to economically reduce the size of the plastic particles to the point where they can be suitably suspended for use in the coating practices heretofore followed. The energy requirements for reducing the size of the particles in ball or pebble mills increases tremendously with decreasing size of the particle produced. It has also been found that molecular breakdown occurs when grinding to extremely small sizes in pebble and ball mills, and for this reason it is often necessary to grind under refrigerated conditions, for example "Teflon" is frequently ground under refrigeration.

I have discovered a method of applying plastic materials of the thermoplastic and thermosetting types such as polymers and copolymers of the monochlorotrifluoroethylene and tetrafluoroethylene families of which the copolymers of monochlorotrifluoroethylene with vinylidene fluoride, vinylidene chloride and the vinyl halides are examples, in which the grinding to fine sizes is carried substantially simultaneously with the application of the coating to the object to be coated. I have found that by following the method of my invention it is possible to materially reduce the cost of grinding the plastic and the cost of coating an object and that it is possible to avoid many, if not most, of the difficulties characteristic of the processes heretofore used for applying plastic coatings as well as to coat surfaces of objects not heretofore possible to coat by existing methods.

I have discovered a method of coating objects with protective plastic coatings which comprises generally the steps of heating the object to be coated to a temperature at which particles of the plastic coating material will adhere to the object, forming a suspension of particles of the coating material in a fluid (liquid or gaseous) stream, moving the particles at high velocity and causing at least some of the particles to enter into one or more collisions in the presence of the heated object whereby the particles of coating material are broken up into finer particles and the resulting finer particles adhere to the heated object. I have found that the method of my invention may be used for applying coatings either to the interior or the exterior or both of an object to be coated. My method is preferably carried out by heating the object to be coated to a temperature above the softening point (in the case of thermoplastic resins) or above the setting point (in the case of thermosetting resins) suspending particles of plastic to be used as the coating material in a gaseous stream, dividing the stream into two portions, moving the two portions at high velocities in opposite directions so as to cause the particles in the two streams to collide with one another thereby grinding or breaking them into fine particles which settle upon the heated object and because of their fine size, fuse into a continuous coating thereon. When it is desired to coat the interior of an object such as the interior of a valve, my method may be carried out by directing two or more opposed streams into the interior of the valve where the larger particles of one stream impinge upon the particles of the other stream, causing the particles to be broken up into finer particles which tend to float into the remote parts of the valve interior and settle thereon whereupon the heat of the valve causes them to fuse into a continuous coating covering the entire internal surfaces of the valve.

The larger unbroken particles which remain after the collisions and which are too large to fuse may be returned to the gaseous stream and again caused to enter into collisions which cause them to break down into finer particles.

When using a liquid-carrying agent for the plastic particles the stream of liquid and plastic enters into collision creating a fog which deposits upon the article to be coated, the liquid evaporates and the remaining plastic fuses to the article to form a coating.

Where the temperature of the object to be coated is high enough to cause the finely divided particles to adhere but not to fuse, I raise the temperature of the object with its adherent coating to a point above the softening point or the setting point, as the case may be, of the coating but below the decomposition temperature and retain it at that temperature until a continuous film is formed.

It is possible to use, not only individual resins in the method of my invention, but also mixtures of compatible resins as well as resins with compatible filler materials and pigments.

In the accompanying drawing I have illustrated one method of practicing my invention. In the drawing there is illustrated a pulverizing chamber 10 having a pair of opposed injection guns 11 which introduce particles of plastic delivered through feed lines 12 by screw conveyors 13 from raw material hoppers 14. The injection guns 11 are operated by a suitable high pressure fluid stream such as compressed air or steam introduced through jets 15 from high pressure lines 16. The particles are carried by the high pressure fluid stream through the injection guns 11 into the interior of the pulverizing chamber where they are caused to collide with one another and be reduced in size by the consequent attrition. The particles are carried upwardly where they come in contact with the heated object 20 to be coated. The object is preliminarily heated and then placed on a rack 18 in a coating chamber 19 above the injection guns 11 where the fine particles resulting from the collisions settle upon all parts of it and adhere thereto forming a coating over all of the exposed surfaces. When the object is coated it is removed from the coating chamber through a removable cover 21. The excess material is carried from the coating chamber through return passages 17 to the injection guns 11 where it is reintroduced into the pulverizing chamber.

My invention may be practiced in various other types of apparatus. For example the "Blaw-Knox Jet Pulverizer" may be conveniently and satisfactorily used for carrying out my invention. In that apparatus two or more opposed streams of particles suspended in a gaseous stream are directed into a common point where the particles strike one another and are finely divided in much the same manner as in the apparatus described above. These finely divided particles are then permitted to settle on the heated object to be coated where they fuse to form a coating.

In practicing my invention it is possible to collect the finer particles and direct them onto the heated object to be coated but this is not necessary in most instances.

It is desirable to maintain the temperature of the object to be coated above the softening point of the coating material and to this end any well-known means may be used in conjunction with the pulverizing apparatus.

While I have described certain preferred practices of my invention it will be understood that it may be otherwise practiced within the scope of the following claims.

I claim:

1. The method of coating objects with protective coatings comprising the steps of heating the object to be coated to a temperature at which finely divided particles of coating material will adhere to the object without decomposing, forming a suspension of particles of the coating material in fluid stream, moving the particles at high velocity and causing at least some of the particles to enter into one or more collisions in the presence of the heated object, whereby the particles of coating material are broken up into finer particles and the resulting finer particles adhere to and are fused on the heated object.

2. The method of coating objects with protective coatings comprising the steps of heating the object to be coated to a temperature at which finely divided particles of coating material will adhere to the object without decomposing, forming a suspension of particles of the coating material in a fluid stream, moving the stream at high velocity and causing at least some of the particles to enter one or more collisions in the presence of the heated object, whereby a portion of the particles are broken up into finer particles, collecting the larger particles remaining after the collisions and subjecting them to further collisions in the fluid stream, permitting the broken-up finer particles to settle upon the heated object and adhere, fusing the adhering particles to form a continuous coating, and continuing in such fashion until the object is coated.

3. The method of coating objects with protective coatings comprising the steps of heating the object to be coated to a temperature to which finely divided particles of coating material will adhere to the object without decomposing, forming a suspension of particles of the coating material in a fluid stream, dividing the stream into at least two portions, moving at least two portions at high velocity, directing the streams in opposite directions to cause the particles suspended therein to impinge on one another in the presence of the heated object, whereby a portion of the particles of coating material are broken up into finer particles, and the resulting finer particles adhere to and are fused to the heated object.

4. The method of coating objects with protective coatings comprising the steps of heating the object to be coated to a temperature to which finely divided particles of coating material will adhere to the object without decomposing, forming a suspension of particles of the coating material in a fluid stream, dividing the stream into at least two portions, moving at least two portions at high velocity, directing the streams in opposite directions to cause the particles suspended therein to impinge on one another in the presence of the heated objects, whereby a portion of the particles of coating material are broken up into finer particles, collecting the larger particles remaining after the impingement and subjecting them to further impingements on one another, permitting the broken-up finer particles to settle upon and adhere to the heated object, continuing in such fashion until the object is coated, and fusing the coating to form a continuous film.

5. The method of coating objects with protective coatings comprising the steps of heating the object to be coated to a temperature above the softening point and below the decomposition temperature of the coating material, forming a suspension of particles of the coating material in a fluid stream, moving the particles at high velocity and causing at least some of the particles to enter into one or more collisions in the presence of the heated object, whereby the particles of the coating material are broken up into finer particles, and the resulting finer particles fused to the heated object.

6. The method of coating objects with protective coatings comprising the steps of heating the object to be coated to a temperature above the softening point and below the decomposition temperature of the coating material, forming a suspension of particles of the coating material in a fluid stream, moving the particles at high velocity and causing at least some of the particles to enter into one or more collisions in the presence of the heated object, whereby the particles of the coating material are broken up into finer particles, collecting the larger particles remaining after the collisions and subjecting them to further collisions in a fluid stream, permitting the broken-up finer particles to settle upon the heated object and fuse thereon, continuing in such fashion until the object is coated.

7. The method of coating objects with protective coatings comprising the steps of heating the object to be coated to a temperature above the softening point and below the decomposition temperature of the coating material, forming a suspension of particles of the coating material in a fluid stream, dividing the fluid stream into two portions, moving the two portions at high velocity, directing the two portions in opposite directions to cause the particles suspended therein to impinge on one another in the presence of the heated object, whereby the particles of coating material are broken up into finer particles, and the resulting finer particles fused to the heated object.

8. The method of coating objects with protective coatings comprising the steps of heating the object to be coated to a temperature above the softening point and below the decomposition temperature of the coating material, forming a suspension of particles of the coating material in a fluid stream, dividing the fluid stream into two portions, moving the two portions at high velocity, directing the two portions in opposite directions to cause the particles suspended therein to impinge on one another in the presence of the heated object, whereby the particles of coating material are broken up into finer particles, collecting the larger particles remaining after the impingement and subjecting them to further impingement on one another, permitting the broken-up finer particles to settle upon the heated object and fuse thereon, and continuing in such fashion until the object is coated.

9. The method of coating objects with protective plastic coatings comprising the steps of heating the object to be coated to a temperature above the softening point and below the decomposition temperature of the coating material, forming a suspension of particles of the coating material in a gaseous stream, moving the particles at high velocity and causing at least some of the particles to enter into one or more collisions in the presence of the heated object, whereby the particles of coating material are broken up into finer particles and the resulting finer particles fused to the heated object.

10. The method of coating objects with protective plastic coatings comprising the steps of heating the object to be coated to a temperature above the softening point of the coating material, forming a suspension of particles of the coating material in a gaseous stream, moving the stream at high velocity and causing at least some of the particles to enter into one or more collisions in the presence of the heated object, whereby a portion of the particles are broken up into finer particles, collecting the larger particles remaining after the collisions and subjecting them to further collisions in a gaseous stream, permitting the broken-up finer particles to settle upon the heated object and fuse thereon and continuing in such fashion until the object is coated.

11. The method of coating objects with protective plastic coatings comprising the steps of heating the object to be coated to a temperature above the softening point of the coating material, forming a suspension of particles of the coating material in a gaseous stream, dividing the stream into two portions, moving the two portions at high velocity, directing the two streams in opposite directions to cause the particles suspended therein to impinge on one another in the presence of the heated object, whereby the particles of coating material are broken up into finer particles and the resulting finer particles fused to the heated object.

12. The method of coating objects with protective plastic coatings comprising the steps of heating the object to be coated to a temperature above the softening point of the coating material, forming a suspension of particles of the coating material in a gaseous stream, dividing the stream into two portions, moving the two portions at high velocity, directing the two streams in opposite directions to cause the particles suspended therein to impinge on one another in the presence of the heated object, whereby a portion of the particles of coating material are broken up into finer particles, collecting the larger particles remaining after the impingement and subjecting them to further impingements on one another, permitting the broken-up finer particles to settle upon the heated object and fuse thereon and continuing in such fashion until the object is coated.

13. The method of coating the interior of hollow objects having at least one opening therein with a protective plastic coating comprising the steps of heating the portion of the object to be coated to a temperature above the softening temperature of the coating material, forming a suspension of particles of the coating material in a gaseous stream, moving the stream at high velocity into the opening in the object and causing at least some of the particles to enter into one or more collisions while in the interior of the object, whereby said particles are broken up into finer particles and fused to the interior of the object.

14. The method of coating the interior of hollow objects having at least one opening therein with a protective plastic coating comprising the steps of heating the portion of the object to be coated to a temperature above the softening temperature of the coating material, forming a suspension of particles of the coating material in a gaseous stream, dividing the stream into two portions, moving the two streams at high velocity, directing the two streams through an opening into the interior of the hollow object so as to intersect within the interior of the object and cause the particles to impinge on one another, whereby said particles are broken up into finer particles and fused to the interior of the object.

15. The method of coating objects with protective plastic coatings comprising the steps of heating the object to be coated to a temperature above the softening point of the coating material, forming a suspension of particles of the coating material in a gaseous stream, moving the stream at high velocity and causing at least some of the particles to enter into one or more collisions in the presence of the heated object, all the while maintaining the temperature of the object above the softening point of the coating material, whereby the particles of coating material are broken up into finer particles and the resulting finer particles fused to the heated object.

16. The method of coating objects with protective plastic coatings comprising the steps of heating the object to be coated to a temperature above the softening point of the coating material, forming a suspension of particles of the coating material in a gaseous stream, moving the stream at high velocity and causing at least some of the particles to enter into one or more collisions in the presence of the heated object, whereby a portion of the particles are broken up into finer particles, collecting the larger particles remaining after the collisions and subjecting them to further collisions in a gaseous stream, permitting the broken-up finer particles to settle upon the heated object and fuse thereon and continuing in such fashion until the object is coated, all the while maintaining the temperature of the object above the softening point of the coating material.

17. The method of coating objects with protective plastic coatings comprising the steps of heating the object to be coated to a temperature above the softening point of the coating material, forming a suspension of particles of the coating material in a gaseous stream, dividing the stream into two portions, moving the two portions at high velocity, directing the two streams in opposite directions to cause the particles suspended therein to impinge on one another in the presence of the heated object, all the while maintaining the temperature of the object above the softening point of the coating material, whereby the particles of coating material are broken up into finer particles and the resulting finer particles fused to the heated object.

18. The method of coating objects with protective plastic coatings comprising the steps of heating the object to be coated to a temperature above the softening point of the coating material, forming a suspension of particles of the coating material in a gaseous stream, dividing the stream into two portions, moving the two portions at high velocity, directing the two streams in opposite directions to cause the particles suspended therein to impinge on one another in the presence of the heated object, whereby a portion of the particles of coating material are broken up into finer particles, collecting the larger particles remaining after the impingement and subjecting them to further impingements on one another, permitting the broken-up finer particles to settle upon the heated object and fuse thereon and continuing in such fashion until the object is coated, all the while maintaining the temperature of the object above the softening point of the coating material.

19. The method of coating the interior of hollow objects having at least one opening therein with a protective plastic coating comprising the steps of heating the portion of the object to be coated to a temperature above the softening temperature of the coating material, forming a suspension of particles of the coating material in a gaseous stream, moving the stream at high velocity into the opening in the object and causing at least some of the particles to enter into one or more collisions while in the interior of the object, whereby said particles are broken up into finer particles and fused to the interior of the object, all the while maintaining the temperature of the object above the softening point of the coating material.

20. The method of coating the interior of hollow objects having at least one opening therein with a protective plastic coating comprising the steps of heating the portion of the object to be coated to a temperature above the softening temperature of the coating material, forming a suspension of particles of the coating material in a gaseous stream, dividing the stream into two portions, moving the two streams at high velocity, directing the two streams through an opening into the interior of the hollow object so as to intersect within the interior of the object and cause the particles to impinge on one another, whereby said particles are broken up into finer particles and fused to the interior of the object, all the while maintaining the temperature of the object above the softening point of the coating material.

21. The method of coating objects with a protective coating of at least one of the group consisting of polymers and copolymers of monochlorotrifluoroethylene comprising the steps of heating the object to be coated to a temperature above the softening point of the polymonochlorotrifluoroethylene, forming a suspension of particles of polymonochlorotrifluoroethylene in a gaseous stream, moving the stream at high velocity and causing at least some of the particles to enter into one or more collisions in the presence of the heated object, whereby the particles of polymonochlorotrifluoroethylene are broken up into finer particles and the resulting finer particles fused to the heated object.

22. The method of coating objects with a protective coating of at least one of the group consisting of polymers and copolymers of monochlorotrifluoroethylene comprising the steps of heating the object to be coated to a temperature above the softening point of the polymonochlorotrifluoroethylene, forming a suspension of particles of polymonochlorotrifluoroethylene in a gaseous stream, dividing the stream into two portions, moving the two portions at high velocity, directing the two streams in opposite directions to cause the particles suspended therein to impinge on one another in the presence of the heated object, whereby the particles of polymonochlorotrifluoroethylene are broken up into finer particles and the resulting finer particles fused to the heated object.

23. The method of coating objects with a protective coating of at least one of the group of polymers and copolymers of tetrafluoroethylene comprising the steps of heating the object to be coated to a temperature above the softening point of the polytetrafluoroethylene, forming a suspension of particles of polytetrafluoroethylene in a gaseous stream, moving the stream at high velocity and causing at least some of the particles to enter into one or more collisions in the presence of the heated object, whereby the particles of polytetrafluoroethylene are broken up into finer particles and the resulting finer particles fused to the heated object.

24. The method of coating objects with a protective coating the group consisting of polymers and copolymers of tetrafluoroethylene comprising the steps of heating the object to be coated to a temperature above the softening point of the polytetrafluoroethylene, forming a suspension of particles of polytetrafluoroethylene in a gaseous stream, dividing the stream into two portions, moving the two portions at high velocity, directing the two streams in opposite directions to cause the particles suspended therein to impinge on one another in the presence of the heated object, whereby the particles of polytetrafluoroethylene are broken up into finer particles and the resulting finer particles fused to the heated object.

References Cited in the file of this patent

UNITED STATES PATENTS

| Number | Name | Date |
|---|---|---|
| 1,058,313 | Luckenbach | Apr. 8, 1913 |
| 1,160,980 | Geer | Nov. 16, 1915 |
| 1,703,634 | Podszus | Feb. 26, 1929 |
| 1,847,009 | Kollbohm | Feb. 23, 1932 |
| 1,948,609 | Andrews et al. | Feb. 27, 1934 |
| 2,059,983 | Dent et al. | Nov. 3, 1936 |
| 2,197,792 | Erickson | Apr. 23, 1940 |
| 2,234,152 | Archer | Mar. 4, 1941 |
| 2,270,341 | Ransburg | Jan. 20, 1942 |
| 2,494,153 | Andrews et al. | Jan. 10, 1950 |
| 2,567,162 | Sanders | Sept. 4, 1951 |
| 2,612,320 | Croft | Sept. 30, 1952 |
| 2,619,443 | Robinson | Nov. 25, 1952 |

FOREIGN PATENTS

| 566,745 | Great Britain | Jan. 11, 1945 |

OTHER REFERENCES

British Plastics, "Coating with Polythene," August 1950, pp. 56 to 59.